US009650903B2

(12) United States Patent
Hoke et al.

(10) Patent No.: US 9,650,903 B2
(45) Date of Patent: May 16, 2017

(54) COMBUSTOR TURBINE INTERFACE FOR A GAS TURBINE ENGINE

(75) Inventors: James B. Hoke, Tolland, CT (US); Philip J. Kirsopp, Lebanon, CT (US)

(73) Assignee: United Technologies Corporation, Farmington, CT (US)

( * ) Notice: Subject to any disclaimer, the term of this patent is extended or adjusted under 35 U.S.C. 154(b) by 2634 days.

(21) Appl. No.: 12/549,693

(22) Filed: Aug. 28, 2009

(65) Prior Publication Data

US 2011/0052381 A1 Mar. 3, 2011

(51) Int. Cl.

| | |
|---|---|
| ***F02C 1/00*** | (2006.01) |
| ***F01D 9/02*** | (2006.01) |
| ***F01D 9/04*** | (2006.01) |

(52) U.S. Cl.

CPC ............. *F01D 9/023* (2013.01); *F01D 9/041* (2013.01); *F05D 2240/80* (2013.01); *F05D 2250/141* (2013.01)

(58) Field of Classification Search

USPC ................ 60/796, 805, 752; 415/191, 208.2, 415/209.2–209.4, 210.1, 211.2

See application file for complete search history.

(56) References Cited

U.S. PATENT DOCUMENTS

| | | | | |
|---|---|---|---|---|
| 2,055,928 | A | | 9/1936 | Hays |
| 2,918,978 | A | | 12/1959 | Fanti |
| 3,302,926 | A | * | 2/1967 | Bobo ......................... 415/209.2 |
| 3,478,987 | A | | 11/1969 | Dorand |
| 3,614,260 | A | | 10/1971 | Ellinger |
| 3,954,230 | A | | 5/1976 | Machuta |
| 4,000,868 | A | | 1/1977 | Gregor |
| 4,012,908 | A | | 3/1977 | Dundore |
| 4,135,362 | A | | 1/1979 | Glenn |
| 4,235,397 | A | | 11/1980 | Compton |
| 4,295,784 | A | | 10/1981 | Manning |
| 4,652,208 | A | | 3/1987 | Tameo |
| 4,664,594 | A | | 5/1987 | Mandet et al. |
| 4,679,400 | A | * | 7/1987 | Kelm et al. ..................... 60/722 |
| 4,705,452 | A | | 11/1987 | Karadimas |
| 4,733,538 | A | | 3/1988 | Vdoviak et al. |
| 4,768,922 | A | | 9/1988 | Kozak et al. |
| 4,856,962 | A | | 8/1989 | McDow |

(Continued)

FOREIGN PATENT DOCUMENTS

| | | | |
|---|---|---|---|
| EP | 1741877 | A | 1/2007 |
| EP | 1985806 | A | 10/2008 |

(Continued)

OTHER PUBLICATIONS

European Search Report for European Patent Application No. 10251501.2 completed Sep. 9, 2013.

*Primary Examiner* — Gerald L Sung

(74) *Attorney, Agent, or Firm* — Carlson, Gaskey & Olds, PC

(57) ABSTRACT

A turbine vane downstream of a combustor section includes an arcuate outer vane platform defined about an axis, the arcuate outer vane platform includes a segment of the arcuate outer vane platform along the axis which follows an outer combustor liner panel structure and an arcuate inner vane platform defined about the axis, the arcuate inner vane platform includes a segment of the arcuate inner vane platform along the axis which follows an inner combustor liner panel structure.

2 Claims, 6 Drawing Sheets

(56) References Cited

U.S. PATENT DOCUMENTS

| | | | | |
|---|---|---|---|---|
| 4,861,228 | A | 8/1989 | Todman | |
| 5,207,558 | A | 5/1993 | Hagle et al. | |
| 5,332,357 | A | 7/1994 | Tubbs | |
| 5,343,694 | A * | 9/1994 | Toborg et al. | 60/796 |
| 5,520,511 | A | 5/1996 | Loudet et al. | |
| 5,628,193 | A * | 5/1997 | Kington et al. | 60/752 |
| 6,004,620 | A | 12/1999 | Camm | |
| 6,290,459 | B1 * | 9/2001 | Correia | 415/139 |
| 6,495,207 | B1 | 12/2002 | Prociw et al. | |
| 6,718,774 | B2 | 4/2004 | Razzell | |
| 6,871,488 | B2 | 3/2005 | Oskooei et al. | |
| 6,887,035 | B2 | 5/2005 | Bruce | |
| 7,025,564 | B2 | 4/2006 | Nichtawitz et al. | |
| 7,076,956 | B2 | 7/2006 | Young et al. | |
| 7,114,920 | B2 | 10/2006 | Synnott | |
| 7,118,322 | B2 | 10/2006 | Mortgat | |
| 7,172,388 | B2 | 2/2007 | Synnott | |
| 7,185,853 | B2 | 3/2007 | Kelnhofer et al. | |
| 7,229,247 | B2 | 6/2007 | Durocher et al. | |
| 7,229,249 | B2 | 6/2007 | Durocher et al. | |
| 7,238,003 | B2 | 7/2007 | Synnott et al. | |
| 7,260,936 | B2 * | 8/2007 | Patel et al. | 60/752 |
| 7,263,772 | B2 | 9/2007 | Prociw et al. | |
| 7,266,941 | B2 | 9/2007 | Eleftheriou et al. | |
| 7,370,467 | B2 | 5/2008 | Eleftheriou et al. | |
| 7,412,831 | B2 | 8/2008 | Ullyott | |
| 7,934,382 | B2 * | 5/2011 | Burd | 60/752 |
| 8,038,389 | B2 * | 10/2011 | Arness et al. | 415/190 |
| 8,291,709 | B2 * | 10/2012 | Cayre et al. | 60/755 |
| 2006/0123797 | A1 * | 6/2006 | Zborovsky et al. | 60/800 |
| 2006/0272335 | A1 * | 12/2006 | Schumacher et al. | 60/804 |
| 2007/0134088 | A1 * | 6/2007 | Lee et al. | 415/209.2 |
| 2007/0144177 | A1 * | 6/2007 | Burd | 60/752 |
| 2010/0095678 | A1 * | 4/2010 | Hawie et al. | 60/752 |

FOREIGN PATENT DOCUMENTS

| | | | |
|---|---|---|---|
| EP | 2042806 | A1 | 4/2009 |
| GB | 1193587 | A | 6/1970 |

* cited by examiner

COMBUSTOR TURBINE INTERFACE FOR A GAS TURBINE ENGINE

STATEMENT REGARDING FEDERALLY SPONSORED RESEARCH OR DEVELOPMENT

This disclosure was made with Government support under N00019-02-C-3003 awarded by The United States Air Force. The Government has certain rights in this disclosure.

BACKGROUND

The present disclosure relates to a gas turbine engine, and more particularly to an interface between a combustor section and a turbine section.

Air compressed in a compressor section of a gas turbine engine is mixed with fuel, burned in a combustor section and expanded in a turbine section. The flow path from the combustor section to the turbine section is defined by the interface therebetween. The geometry of the interface may result in flow stagnation or bow wave effects that may increase the thermal load within the interface. The thermal load may cause oxidation of combustor liner panels, turbine vane leading edges and platforms which may result in durability issues over time.

SUMMARY

A turbine vane downstream of a combustor section according to an exemplary aspect of the present disclosure includes an arcuate outer vane platform defined about an axis, the arcuate outer vane platform includes a segment of the arcuate outer vane platform along the axis which follows an outer combustor liner panel structure and an arcuate inner vane platform defined about the axis, the arcuate inner vane platform includes a segment of the arcuate inner vane platform along the axis which follows an inner combustor liner panel structure.

A gas turbine engine according to an exemplary aspect of the present disclosure includes a combustor section with an outer combustor liner panel structure and an inner combustor liner panel structure defined about an axis. A turbine section downstream of the combustor section includes an arcuate outer vane platform and an arcuate inner vane platform defined about the axis. The arcuate outer vane platform includes a segment along the axis which follows the outer combustor liner panel structure and the arcuate inner vane platform includes a segment which follows the inner combustor liner panel structure to define a smooth flow path from the combustor section into the turbine section.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
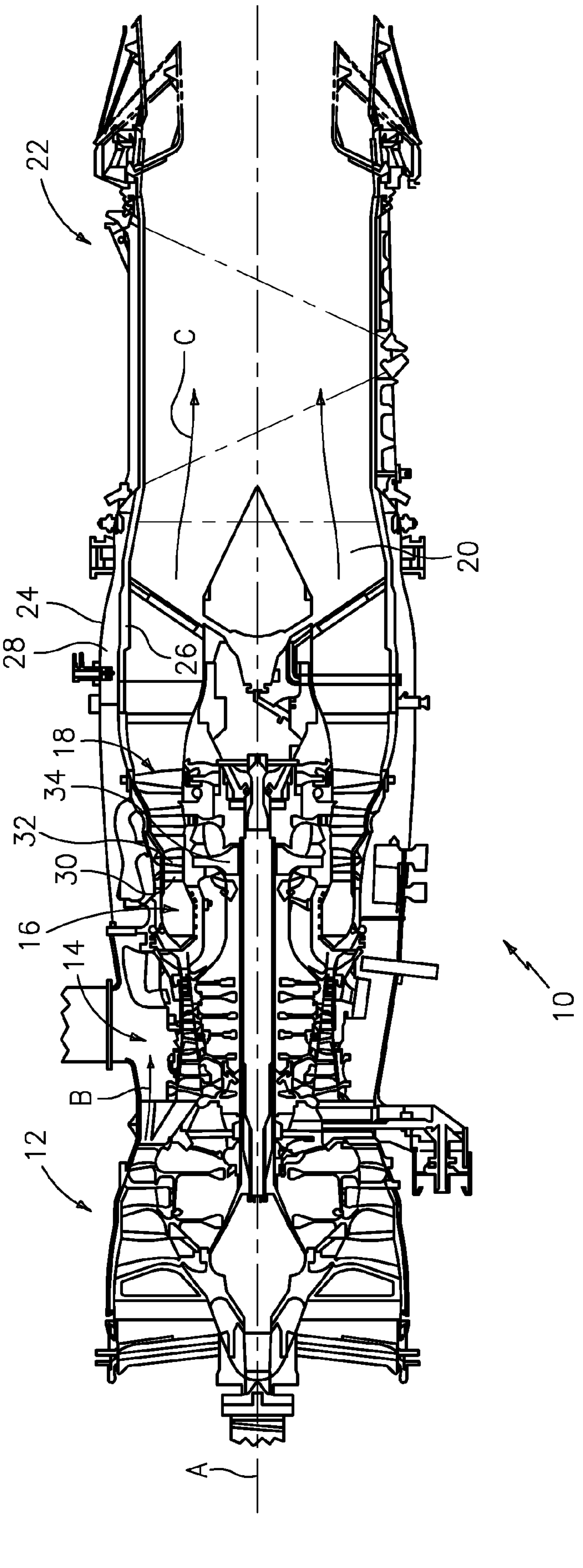
FIG. 1 is a general perspective view an exemplary gas turbine engine embodiment for use with the present disclosure.

FIG. 1 schematically illustrates a gas turbine engine 10 which generally includes a fan section 12, a compressor section 14, a combustor section 16, a turbine section 18, an augmentor section 20, and a nozzle section 22. The compressor section 14, combustor section 16, and turbine section 18 are generally referred to as the core engine. The gas turbine engine 10 defines a longitudinal axis A which is centrally disposed and extends longitudinally through each section. The gas turbine engine 10 of the disclosed non-limiting embodiment is a low bypass augmented gas turbine engine having a three-stage fan, a six-stage compressor, an annular combustor, a single stage high-pressure turbine, a two-stage low pressure turbine and convergent/divergent nozzle, however, various gas turbine engines will benefit from the disclosure.

Air compressed in the compressor section 14 is mixed with fuel, burned in the combustor section 16 and expanded in turbine section 18. The turbine section 18, in response to the expansion, drives the compressor section 14 and the fan section 12. The air compressed in the compressor section 14 and the fuel mixture expanded in the turbine section 18 may be referred to as the core flow C. Air from the fan section 12 is divided between the core flow C and a bypass or secondary flow B. Core flow C follows a path through the combustor section 16 and also passes through the augmentor section 20 where fuel may be selectively injected into the core flow C and burned to impart still more energy to the core flow C and generate additional thrust from the nozzle section 22.

An outer engine case 24 and an inner structure 26 define a generally annular secondary bypass duct 28 around a core flow C. It should be understood that various structure within the engine may be defined as the outer engine case 24 and the inner structure 26 to define various secondary flow paths such as the disclosed bypass duct 28. The core engine is arranged generally within the bypass duct 28. The bypass duct 28 separates airflow sourced from the fan section 12 and/or compressor section 14 as the secondary flow B between the outer engine case 24 and the inner structure 26. The secondary flow B also generally follows a path parallel to the axis A of the engine 10, passing through the bypass duct 28 along the periphery of the engine 10.

The turbine section 18 includes alternate rows of static airfoils or vanes 30 radially fixed to the inner structure 26 and rotary airfoils or blades 32 mountable to disks 34 for rotation about the engine axis A. A first row of vanes 30 is located directly downstream of the combustor section 16.

Figure 2:
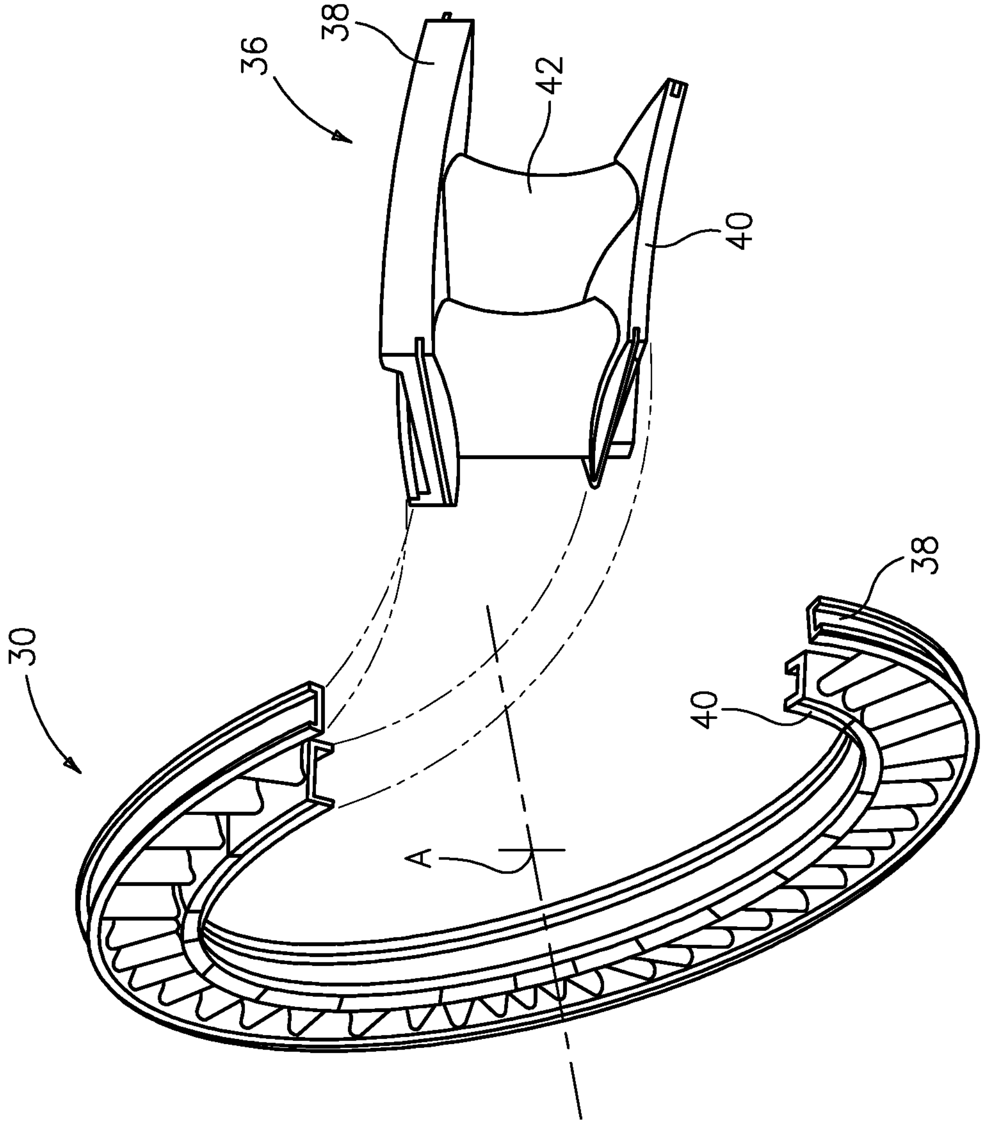
FIG. 2 is an expanded view of a vane portion of a first turbine stage within a turbine section of the gas turbine engine.

Referring to FIG. 2, the first row of vanes 30 may be defined by a multiple of turbine nozzle segment 36 which include an arcuate outer vane platform 38, an arcuate inner vane platform 40 and at least one turbine vane 42 which extends radially between the vane platform 38, 40. The arcuate outer vane platform 38 may form an outer portion of the inner structure 26 and the arcuate inner vane platform 40 may form an inner portion of the inner structure 26 to at least partially define an annular core flow path interface from the combustor section 16 to the turbine section 18 (FIG. 1). The temperature environment of the turbine section 18 and the substantial aerodynamic and thermal loads are accommodated by the multiple of circumferentially adjoining nozzle segments 36 which collectively form a full, annular ring about the centerline axis A.

Figure 3:
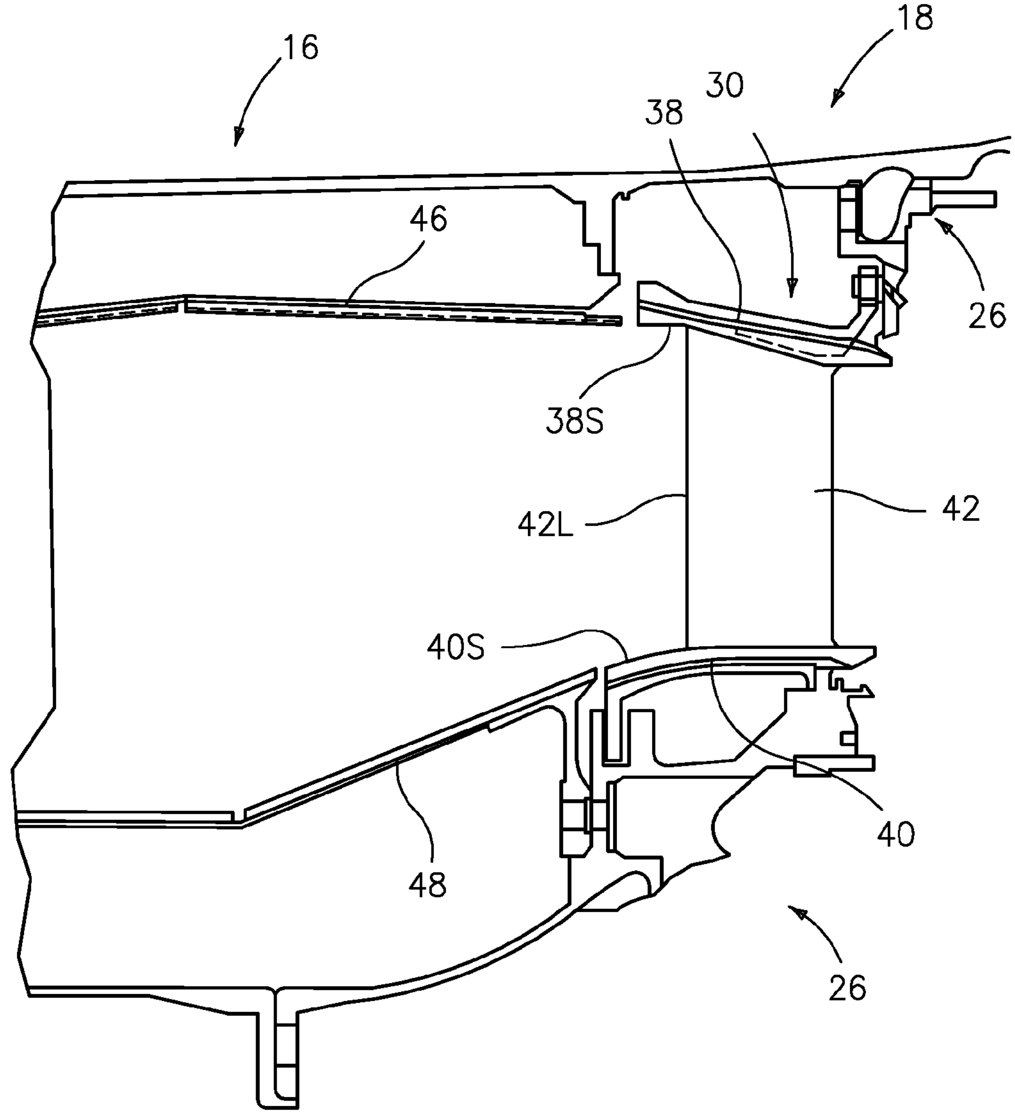
FIG. 3 is an expanded view of a combustor section and a portion of a turbine section downstream thereof.

Referring to FIG. 3, the combustor section 16 includes an annular combustor 44 which includes an outer liner panel structure 46 and an inner liner panel structure 48. The annular combustor 44 in the disclosed, non-limiting embodiment utilizes effusion cooling from the secondary flow B to maintain acceptable temperatures immediately upstream of the first row of turbine vanes 30.

Figure 4:
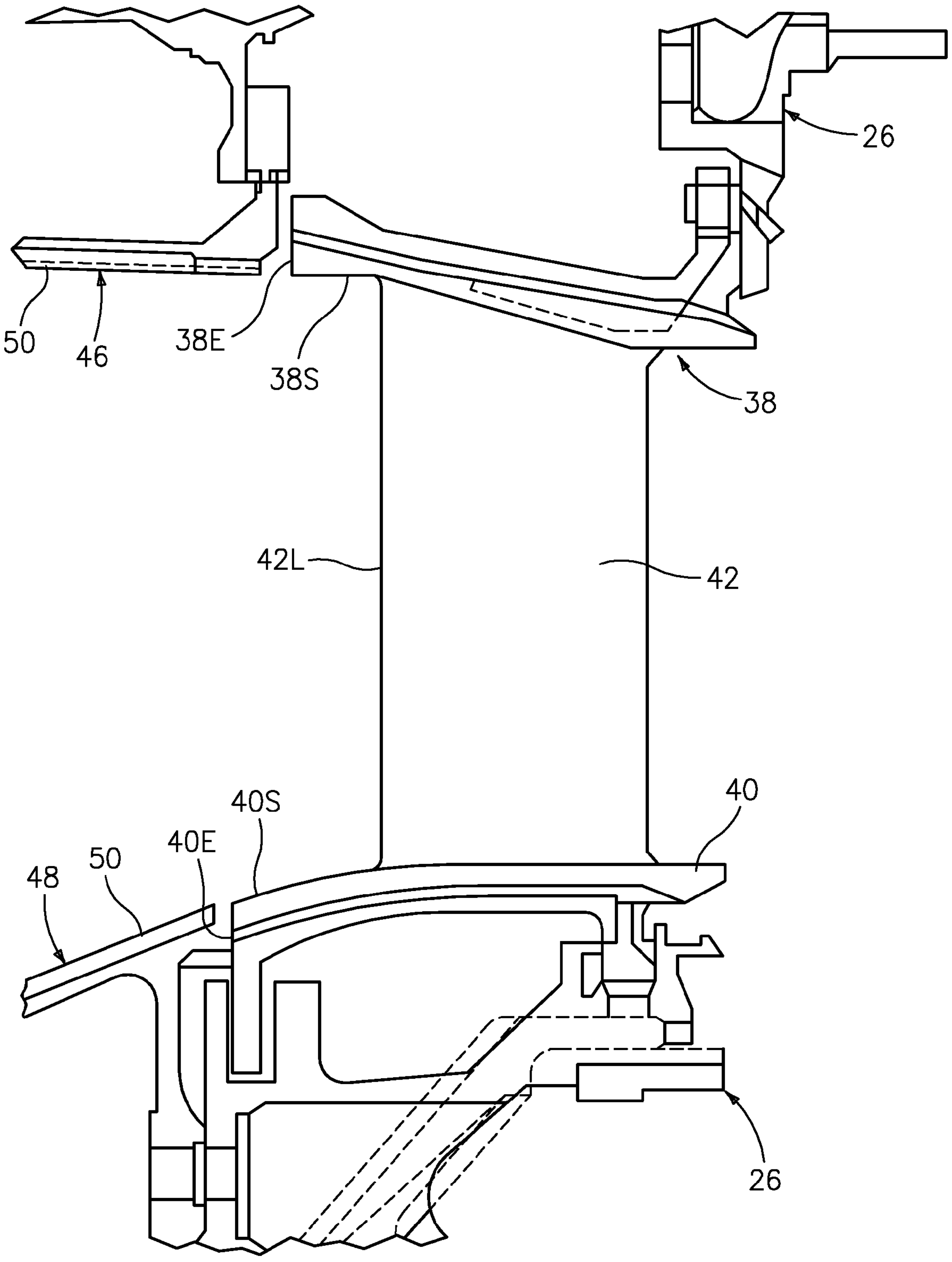
FIG. 4 is an expanded view of an interface between a combustor section and a turbine section.

The outer liner panel structure 46 is located adjacent to the arcuate outer vane platform 38 and the inner liner panel structure 48 is located adjacent to the arcuate inner vane platform 40 to provide a smooth flow path interface between the combustor section 16 and the turbine section 18. A segment 38S of the arcuate outer vane platform 38 is generally contiguous and follows the contour of the outer liner panel structure 46 and a segment 40S of the arcuate inner vane platform 40 is generally contiguous and follows the contour of the inner liner panel structure 48 to define a smooth flow path therebetween. That is, the segment 38S and the segment 40S essentially extend the respective liner panel structure 46, 48. In the disclosed, non-limiting embodiment, the segment 38S and the segment 40S are defined over approximately the first 20% of the vane platforms 38, 40 length (FIG. 4). That is, the smooth flow path defined by the combustor liner panel structure 46, 48 is carried through the first 20% of the respective vane platform 38, 40 length. The smooth flow path avoids generation of the pressure gradients where the secondary flow structures typically originate.

Alternatively, or in addition, a leading edge 42L of the vane 42 is located downstream of the interface between the combustor liner panel structure 46, 48 and the respective vane platform 38, 40 to further minimize stagnation. That is, the leading edge 42L is set back from the forward most leading edge 38E, 40E of the respective vane platform 38, 40 (FIG. 4). In the disclosed, non-limiting embodiment, the leading edge 42L is set back from the leading edge 38E, 40E approximately 20% of the vane platforms 38, 40 length.

With the smooth flow path, cooling for the combustor liner panel structure 46, 48 may be injected from the secondary flow B through effusion holes 50 in the combustor liner panel structure 46, 48 upstream of the combustor section turbine section interface. The cooling flow from the effusion holes within the combustor liner panel structure 46, 48 is mixed with the core flow. The smooth flow path removes or minimizes any step between the combustor liner panel structure 46, 48 and the vane platform 38, 40 to provide a very small total pressure gradient near the vane platform 38, 40. The minimal pressure gradient near the vane platform 38, 40 limits the development of secondary flow effects upon the turbine vanes 42. The reduced secondary flow effects also reduce the radial movement of hot gases from the combustor section 16 towards the vane platform 38, 40 that have hereto fore resulted in durability problems.

Figure 5:
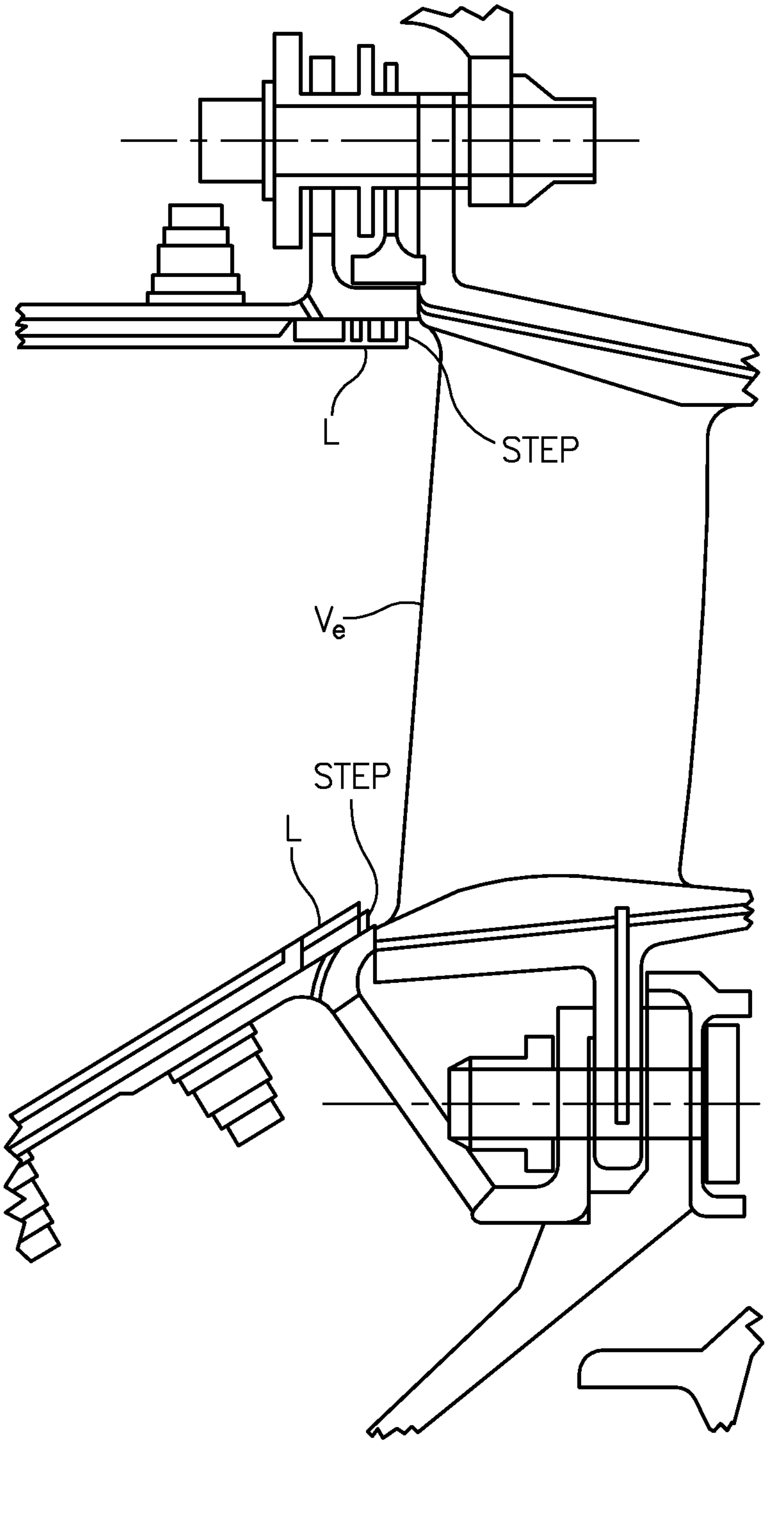
FIG. 5 (RELATED ART)
FIG. 5 is an expanded view of a RELATED ART combustor section and a portion of a turbine section downstream thereof.

In the related art (FIG. 5) an aft end segment of the combustor liner panel L required specific cooling to maintain metal temperatures immediately upstream of a turbine vane leading edge Ve. A step in the flowpath exhausts coolant from the combustor panel upstream of the turbine vane. This flow is exhausted at a lower velocity and total pressure than the core flow and thus a pressure gradient was generated near the turbine vane platform leading edge.

Figure 6:
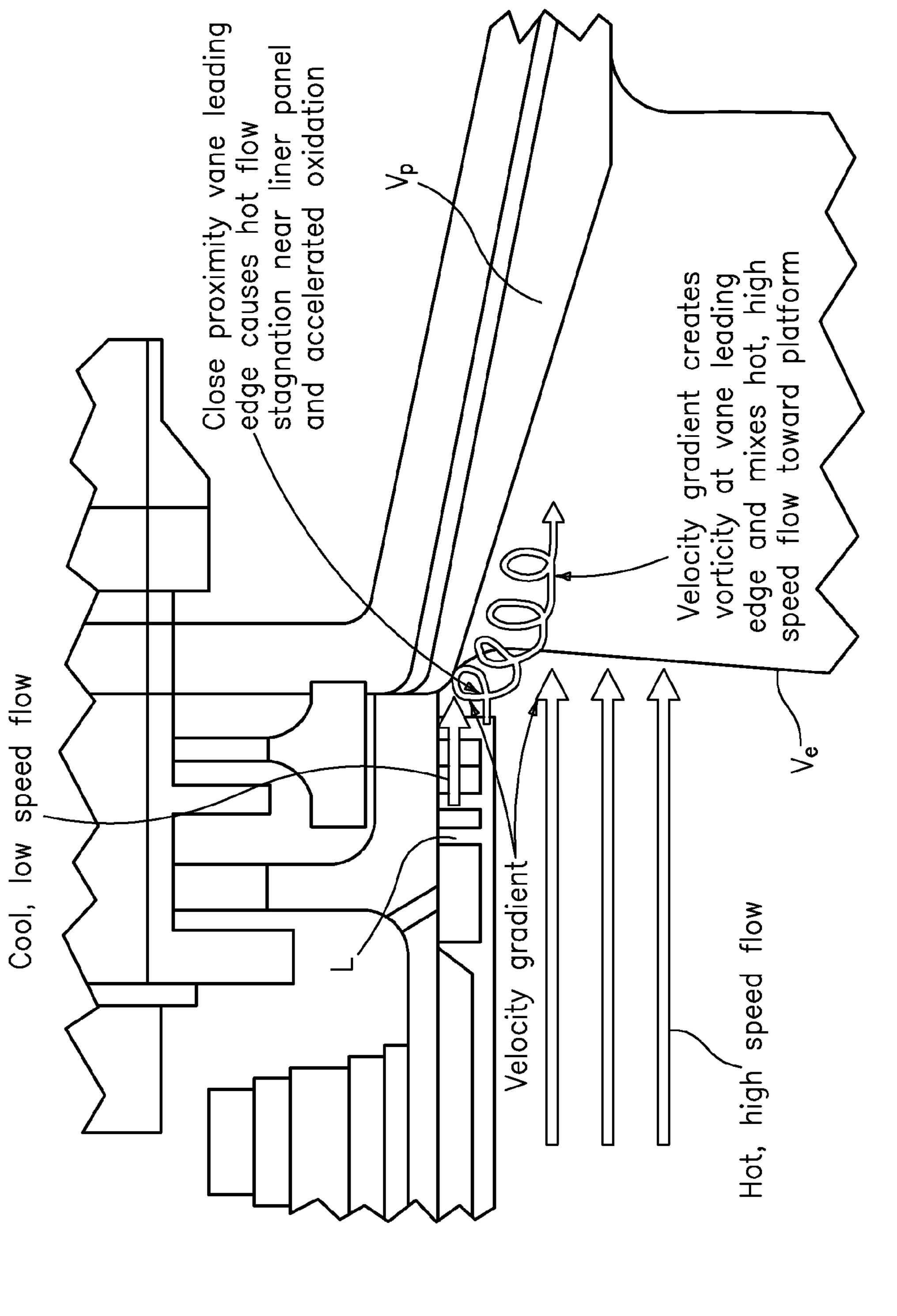
FIG. 6 (RELATED ART)
FIG. 6 is an expanded view of a RELATED ART interface between a combustor section and a turbine section.

Applicant has determined that the removal or minimization of the aft facing step between the combustor liner panel L and the vane platform Vp reduces or eliminates the bow wave effect that increases the thermal load locally which results in stagnation of hot gas at the trailing edge of the liner panel. The aft facing step and cooling exhaust also impacts the flow through the first turbine vane. The cooling air exiting the aft step slot has a much lower velocity than the mainstream flow creating a gradient. This gradient contributes to flow voracity at the leading edge of the turbine vane and results in radial mixing that transports hot gases from the core flow towards the turbine vane platform areas (FIG. 6; related art) which may generate an increased thermal load.

The disclosure provides a geometry that requires less cooling and improves durability. The overall effect is to reduce cooling flow in the combustor section and turbine section, or to achieve improved durability with constant flow through the reduced heat load on the aft end of the combustor liner panels and first turbine vane platforms.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A turbine vane downstream of a combustor section comprising:

an arcuate outer vane platform defined about an axis, said arcuate outer vane platform includes a segment of said arcuate outer vane platform along said axis which follows an outer combustor liner panel structure;

an arcuate inner vane platform defined about said axis, said arcuate inner vane platform includes a segment of said arcuate inner vane platform along said axis which follows an inner combustor liner panel structure;

a vane which extends in a radial direction between said arcuate outer vane platform and said arcuate inner vane platform, said vane defines a leading edge which is set back from a forward most edge of said arcuate outer vane platform and said arcuate inner vane platform; and said segment of said arcuate outer vane platform and said segment of said arcuate inner vane platform follows a respective contour of the outer combustor liner panel structure and the inner combustor liner panel structure.

2. A gas turbine engine comprising:

a combustor section which includes an outer combustor liner panel structure and an inner combustor liner panel structure defined about an axis;

a turbine section downstream of said combustor section, said turbine section includes an arcuate outer vane platform and an arcuate inner vane platform defined about said axis, said arcuate outer vane platform includes a segment along said axis which follows said outer combustor liner panel structure and said arcuate inner vane platform includes a segment which follows said inner combustor liner panel structure to define a smooth flow path from said combustor section into said turbine section;

a vane which extends in a radial direction between said arcuate outer vane platform and said arcuate inner vane platform, said vane defines a leading edge which is set back from a forward most edge of said arcuate outer vane platform and said arcuate inner vane platform; and said segment of said arcuate outer vane platform and said segment of said arcuate inner vane platform follows a respective step-less contour of said outer combustor liner panel structure and said inner combustor liner panel structure.

* * * * *